United States Patent [19]

Brickley

[11] Patent Number: 4,625,588

[45] Date of Patent: Dec. 2, 1986

[54] CONTINUOUSLY VARYING PLANETARY MECHANICAL TRANSMISSION SYSTEM

[76] Inventor: Ray Brickley, 2007 Island Rd., Harvard, Ill. 60033

[21] Appl. No.: 771,614

[22] Filed: Sep. 3, 1985

[51] Int. Cl.[4] .......................... F16H 3/44; F16H 57/10; F16H 37/06

[52] U.S. Cl. ........................................ 74/793; 74/681; 74/682

[58] Field of Search ................. 74/793, 794, 681, 682, 74/705, 789, 412 R, 790

[56] References Cited

U.S. PATENT DOCUMENTS

| | | | |
|---|---|---|---|
| 2,171,610 | 9/1939 | Szekely | 74/682 X |
| 2,200,566 | 5/1940 | Szekely | 74/794 X |
| 2,454,694 | 11/1948 | Grebb | 74/794 |
| 3,079,813 | 3/1963 | Quigley | 74/682 X |
| 3,240,083 | 5/1966 | Stoddard | 74/790 X |
| 3,299,741 | 1/1967 | Twiford | 74/681 X |
| 3,505,908 | 4/1970 | Herrmann | 74/790 |
| 3,511,113 | 5/1970 | Rheault | 74/794 |
| 4,192,203 | 3/1980 | Dailey | 74/793 X |
| 4,327,604 | 5/1982 | Evans | 74/793 X |
| 4,532,828 | 8/1985 | LaGuardia | 74/681 X |

FOREIGN PATENT DOCUMENTS

| | | | |
|---|---|---|---|
| 0123738 | 11/1984 | European Pat. Off. | 74/790 |
| 2535391 | 2/1977 | Fed. Rep. of Germany | 74/790 |
| 725866 | 5/1932 | France | 74/705 |
| 779275 | 4/1935 | France | 74/794 |
| 60644 | 11/1954 | France | 74/681 |
| 180846 | 11/1935 | Switzerland | 74/789 |
| 738498 | 10/1955 | United Kingdom | 74/705 |

OTHER PUBLICATIONS

"Mechanical Movements", pp. 16, 17, Brown & Seward 1893.
"Engineers' Illustrated Thesaurus", pp. 172, 173 Chemical Publishing 1952.

Primary Examiner—Kenneth J. Dorner
Assistant Examiner—Dirk Wright
Attorney, Agent, or Firm—Harry M. Weiss & Associates

[57] ABSTRACT

A continuously varying mechanical transmission generally having two sets of planetary gears is disclosed. The transmission of the present invention has a first planetary group generally comprising a control sun, a driven sun and planet gears and a secondary planetary group generally comprising a sun gear, planetary gears and a ring gear arranged and interconnected to provide an easily controllable reduction of ratio between in-lined driving and driven shafts. Each of the planet gears of the first planetary group, being paired and meshed with each other, interact with the control sun and driven sun to permit the reaction forces in all the components to react or rotate simultaneously.

17 Claims, 4 Drawing Figures

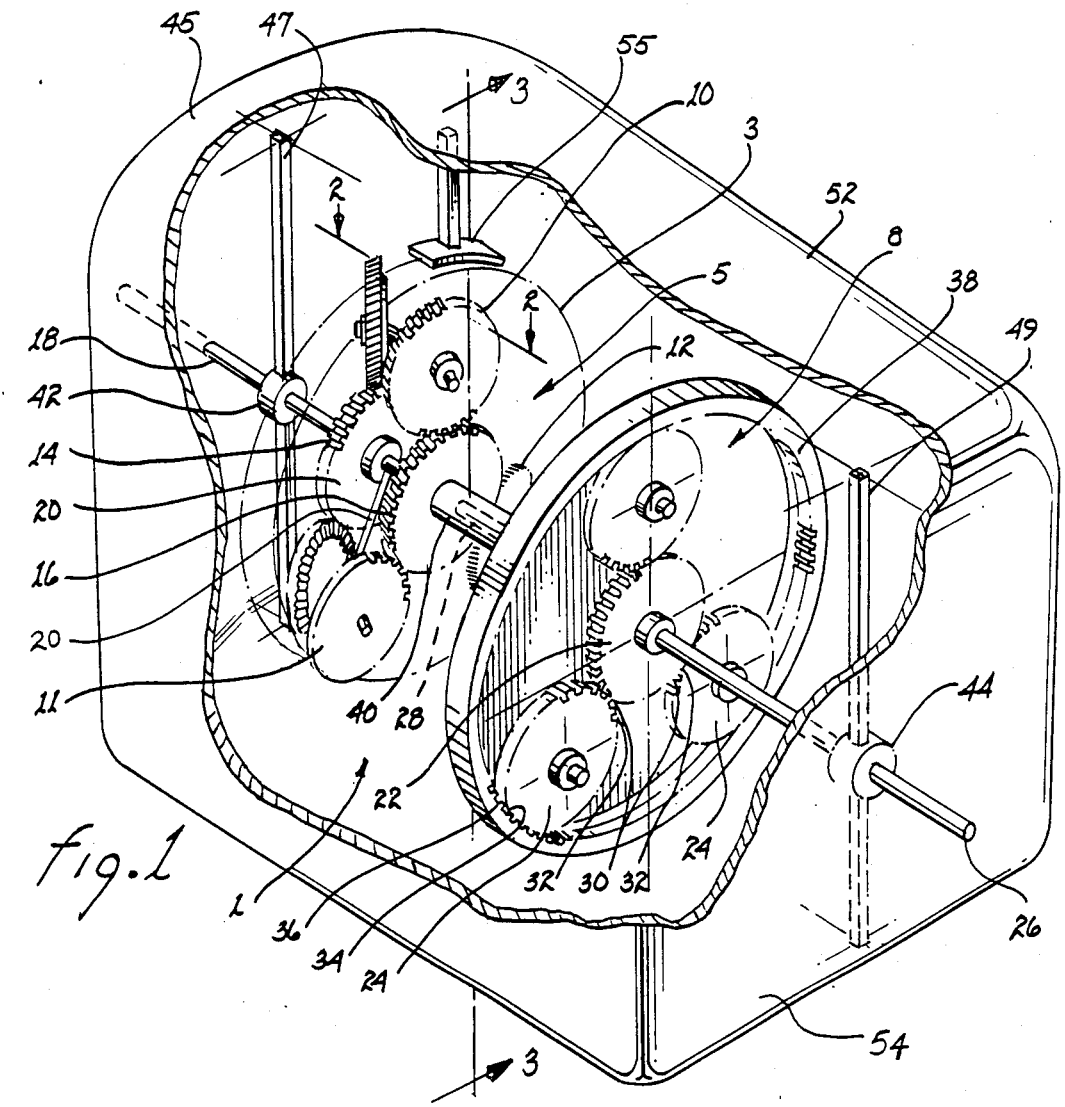
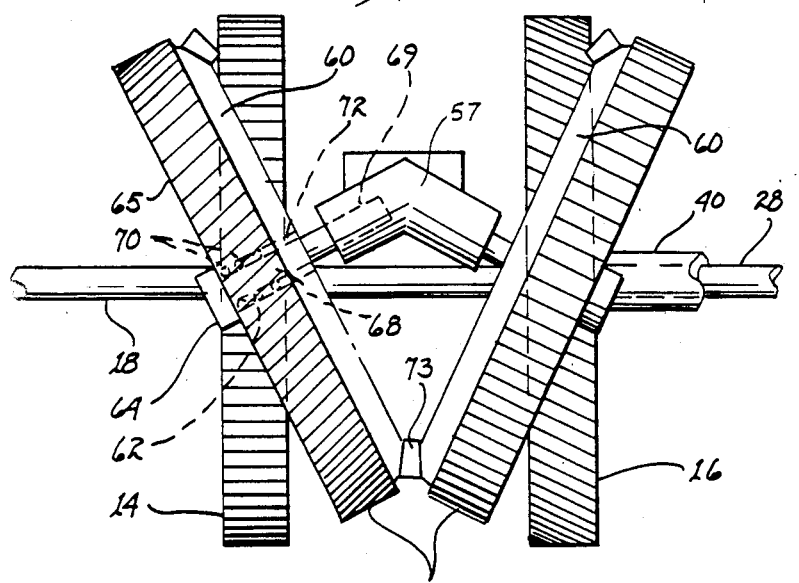
fig.1
fig.2

CONTINUOUSLY VARYING PLANETARY MECHANICAL TRANSMISSION SYSTEM

BACKGROUND OF THE INVENTION

1. Field of the Invention

This invention generally relates to a continuously varying mechanical transmission generally having two sets of planetary gears. The transmission of the present invention has a first planetary group generally comprising a control sun, a driven sun and planet gears and a secondary planetary group generally comprising a load gear, planetary gear and a ring gear arranged and interconnected to provide an easily controllable reduction of ratio between in-lined driving and driven shafts. Each of the planet gears of the first planetary group, being paired and meshed with each other, interact with the control sun and driven sun to permit the reaction forces in all the components to react or rotate simultaneously.

2. Description of the Relevant Art

There has been a substantial need for simplifications and reductions in the cost in manufacturing and maintaining transmission systems. Fluid transmissions (as in U.S. Pat. No. 4,213,352 filed by H. Crawford on Mar. 14, 1978 and issued July 22, 1980; and in U.S. Pat. No. 4,455,891 filed by G. Freeman on Apr. 13, 1981 and issued June 26, 1984) have been developed to provide desirable features. However, fluid transmissions require constant attention and maintenance, especially the need to frequently adjust and replace brake bands associated with such transmissions. More specifically, when used in conventional automobiles, the fluid transmission's torque aversion mechanism is not automatically activated, but require a depression of an accelerator pedal.

The employment of gears of various configurations and arrangements have been provided to simplify continuously variable automatic transmissions as in U.S. Pat. No. 3,015,967 filed on Feb. 8, 1956 by C. Bancroft and issued Jan. 8, 1962; U.S. Pat. No. 3,302,488 filed on Feb. 5, 1963 by F. Graff and issued Feb. 7, 1967; U.S. Pat. No. 3,114,273 filed in May 15, 1962 by B. Boggs and issued Dec. 17, 1963; and U.S. Pat. No. 4,327,604 filed on Sept. 27, 1979 by R. Evans and issued May 4, 1982. The above-mentioned systems are cumbersome in manufacture, maintenance and in operation through the full range of speed reductions required. In U.S. Pat. No. 4,334,440 filed on Mar. 10, 1980 by H. Fouch and issued June 13, 1982, a continuously varying transmission which employs three sets of gears is disclosed. Here, a means is provided to hold planet gears of a second set of gears against rotation about a sun gear of the second set, but allowing said planet gears to rotate in position. Also, a primary rotary means provides input to a ring gear of the first set while a secondary rotary means is connected to planet gears of a third set of gears to be rotated and provide output while sun gears of the first and third sets are typically interconnected by a shaft extending through a sun gear of the second set.

In the present invention, there is a first planetary group comprising of at least three pairs of planets connected together by a control carrier structure operably meshed around control and driven sun gears. The driven sun gear interconnects with a ring gear which is part of a secondary planetary set which in turn operably houses a plurality of planets, interconnected by a driving carrier structure, meshing and surrounding a sun gear which is operably joined to a load, driven or output shaft. The control and driven sun gears, having equal radii operably joined to a common axis and spaced-apart in parallel from each other. A braking control or speed control device gradually locks the planet control carrier to permit a one-to-one ratio (i.e., wherein the first and secondary planetary sets rotate as a single unit) to a gradually zero-to-one ratio between the first and secondary planetary sets.

It is therefore an object of the present invention to provide an improved continuously variable mechanical transmission system wherein a load gear operably connected to an output or driven shaft rotates and follows a rotating control carrier at a continuously and variably reducing operation.

It is another object of the present invention to provide an improved continuously variable mechanical transmission system wherein the rotation or operation of the control carrier is gradually locked by externally operated brakes, thereby overcoming the locking action between the control carrier and plurality of planet gears to permit reduction of said control carrier and plurality of planet gears at their distinct and separate angular velocities relative to their individual axis, as desired.

It is still another object of the present invention to provide an improved continuously variable mechanical transmission system wherein the braking device in its simple mechanical operation and construction bears minimal load sufficient only to overcome the friction between the meshing gears inherent in the operation of the first planetary set.

It is a further object of the present invention to provide an improved continuously variable mechanical transmission system which can be easily and economically produced, yet sturdy in construction and highly efficient in operation.

It is a further object of the present invention to provide an improved continuously variable mechanical transmission system which is constructed with relative simplicity, embodying relatively simple parts, and therefore capable of being retailed for a low price, long-lasting in use, and extremely convenient to operate.

SUMMARY OF THE INVENTION

The aforementioned and other objects of the present invention are accomplished by providing a first planetary group, generally comprising a control sun, a driven sun and a plurality of meshing pairs of planet gears surrounding thereto and a secondary planetary group generally comprising a load gear, planetary gears and a ring gear operably connected to a load, driven or output shaft. A control carrier operably joins and surrounds said plurality of meshing pairs of planet gears therein and a braking control device is communicated thereto for the continuous and infinite reduction of angular velocity or rotation thereby accomplishing a similarly continuous and infinite reduction from a one-to-one ratio of a zero-to-one ratio between the first and secondary planetary sets.

These and other features of the invention will be understood upon reading of the following description along with the drawings.

BRIEF DESCRIPTION OF THE DRAWINGS

FIG. 1 is a perspective view of the preferred embodiment of a continuously variable mechanical transmission showing a control carrier operably surrounding a first planetary set operably coupled to a secondary planetary set which control the output shaft.

FIG. 2 is a top plan view of the first planetary group taken in the direction of arrows 2—2 shown in FIG. 1 generally showing a control sun, a driven sun, at least one meshing pair of planet gears, an associated control carrier coupling and an associated power shaft passing through a common axis of said suns spaced-apart in parallel from each other.

DESCRIPTION OF THE PREFERRED EMBODIMENT

Figure 3:
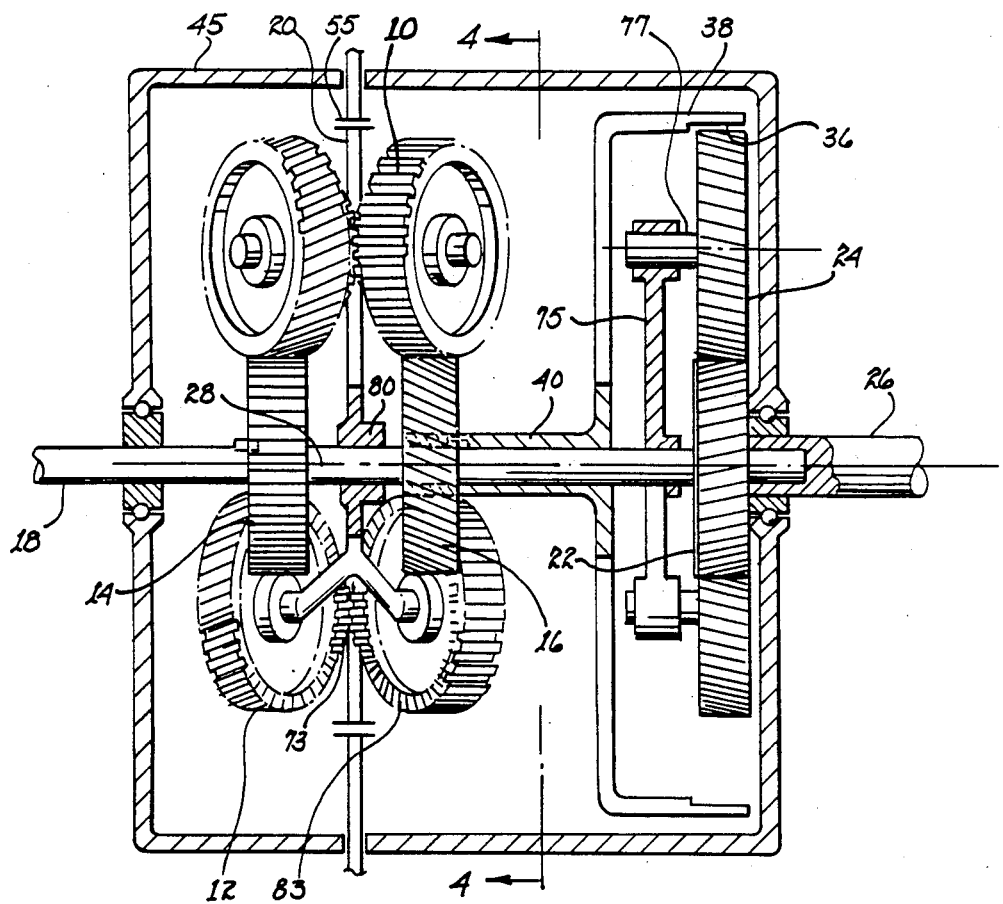
FIG. 3 is a cross-sectional view of the preferred embodiment of the continuously variable mechanical transmission taken in the direction of arrows 3—3 shown in FIG. 1 further illustrating operational relationships between the first and secondary planetary sets, the accompanying connecting operable shafts and transmission casing.

FIG. 1 is a perspective view of a preferred embodiment of a continuously variable mechanical transmission, generally designated by reference number 1, showing a control carrier 3 operably surrounding a first planetary set, generally designated by reference number 5, operably coupled to a secondary planetary set generally designated by reference number 8 which control an output shaft 26.

The first planetary set 5 generally comprises at least three pairs of planets 10, 11, 12 operably connected by the control carrier 3 and operably meshed around a control 14 and driven 16 sun gears. A common axis communicates through the control 14 and driven 16 sun gears in order to permit a power shaft 18 to be operably interposed therethrough. Preferably, the control 14 and driven 16 sun gears are of equal radii; although, each preferably having a 10×-tooth and 9×-tooth gear, respectively.

As further shown in FIG. 1, each of the three pairs of planets 10, 11, 12, having equal radii, angularly mesh with each other and each planet separately meshes with its respective abutting control 14 or driven 16 sun gear. A 9×-tooth planet preferably meshes with the control sun gear 14 while a 10×-tooth planet preferably meshes with the driven sun gear 16.

It is further preferred that the control sun gear 14 to the operably adjoining planets 10, 11, 12 has a rotational ratio of one to one. Moreover, it is preferred that a 3×-tooth driven gear 16 meshes with 4×-tooth planets 10, 11, 12.

In the present embodiment of the instant invention, a plurality of carrier arms 20 coupled to the control carrier 3 operably secures the appropriate rotation of the pairs of planets 10, 11, 12 around the power shaft. Each carrier arm 20 is operably coupled to each pair of planets 10, 11, 12, having an operably coupling means, as will later be discussed (see FIG. 2), while an opposite end of the carrier arm 20 is attached to a bearing means (not shown here) to permit rotation of the carrier arms 20, coupled to the control carrier 3, around the power shaft 18, as will later be discussed. Here, the control carrier 3 is preferably cylindrical to permit complete or substantial housing or enclosure of the first planetary set 12.

Moreover, as shown in FIG. 1, the secondary planetary set 8 generally comprises a load gear 22, preferably a 19×-tooth gear, central to a plurality of planetary gears 24; each planetary gear 24 preferably having a 31×-tooth type gear. The load gear 22 is directly coupled to a load shaft 26 to stimulate therein the actual rotation of the load gear 22. In order to secure the rotating plurality of planetary gears 24 around the load gear 22, a driving carrier 75 (not shown) operably couples to the axis of each of the plurality of planetary gears 24. The central portion of the driving carrier 75 is operably joined at one end of a shaft 28 originating from the power shaft 18 to permit direct simulation by the driving carrier 75 of the actual rotation of the power shaft 18. The load gear 22 and the pluarlity of planetary gears 24 operably communicate at meshed gears 30, 32, respectively. Opposing teeth 34 of each of the planetary gears 24 mesh with internal teeth 36 of an enclosing ring gear 38 preferably having an 81×-tooth type internal gear having an axis operably coupled to a bearing shaft 40 which, in turn, is integrally and operably joined with the driven sun gear 16 operably integrated within the first planetary set 5. Accordingly, the enclosing ring gear 38 directly simulates the rotation of the driven sun gear 16.

It is preferred that the load gear 22 be equal, in size and number of teeth, to each of the operably adjoining pairs of planets 10, 11, 12. It is further preferred that the rotational ratio of the driving carrier 75 to the ring gear 38 be three to four for a synchronization of a resulting rotational ratio of three to four in the first planetary set 5.

As further shown in FIG. 1, both the power 18 and load 26 shafts are operably mounted by bearing assisted members 42, 44, respectively to a transmission casing 45. The bearing assisted member 42, 44 are preferably supported by vertically extending members 47, 49, respectively, integrally bracketed in the upper 52 and bottom 54 walls of the transmission casing 45.

In order to operably control the rotation of the control carrier 3, at least one brake pad means internally extends from the upper 52 or bottom 54 wall of the transmission casing 45.

As shown in FIG. 2, a top plan view of the first planetary set 5, generally illustrates the control 14 and driven 16 sun gears, at least one meshing pair of planet gears 10, 11, 12, the associated power shaft 18 and the shaft 28 passing through the common axis of the control 14 and driven 16 sun gears spaced-apart in parallel from each other, and an associated control carrier coupling 57 operably joined to a pair of internally meshing planets 10, 11, 12 intersecting thereto in beveled gears 60 inherent in each of said meshing planets 10, 11, 12. The control carrier coupling 57 is operably joined to each meshed planets 10, 11, 12 by a generally conventional bearing coupling means 62 comprising essentially of a head member 64 abutting an outwardly face member 65 of the planets 10, 11, 12 having a longitudinal member 68 coupled thereto and extending through the axis of the planets 10, 11, 12 to permit attachment of the opposite end member 69 to the control carrier coupling 57. In order to permit rotation of the planets 10, 11, 12 around the longitudinal member 68, conventional ball bearings 70 are accommodated thereto in spacing 72. Accordingly, the planets 10, 11, 12 rotate around the control 14 and driven 16 sun gears at an angle to permit meshing of the planets 10, 11, 12 with each other at contact point 73 of beveled gears 60.

In order to properly illustrate the operation of the continuously variable mechanical transmission 1 and to more particularly show the operational relationship between the first 5 and secondary 8 planetary sets, the accompanying connecting operable output 26 and power 18 shafts and transmission casing 45, FIG. 3 is shown in a cross-sectional view. Here, power shaft 18 thoroughly extends to a driving carrier 75, being integrally joined thereto in order to rotate at the same direction as the power shaft 18. The accompanying rotation of a plurality of driving carrier arms 77 permit the plurality of the planetary set 8 to rotate around the load gear 22 mounted thereto in load shaft 26. Thus, the opposing reaction from the load shaft 26 subsequently permits rotation of each planetary gear 24 around each driving carrier arms 77 which is attached thereto by conventional bearing means (not shown). The reaction provided by each rotating planetary gear 24, relative to its axis connected thereto by bearing means into each carrier arm 77 and relative to the load gear 22, permits rotation of the ring gear 38 having internal threads 36 operably communicating thereto with the planetary gears 24. The reaction executed by the ring gear 38 is operably communicated to the driven sun gear 16 of the first planetary set 5 operably joined thereto by the bearing shaft 40. A subsequent rotation of the driven sun gear 16 is accordingly achieved to thereby permit rotation therethroughout of the plurality of pairs of planets 10, 11, 12 angularly meshed with each other. Upon rotation of the meshing parts of planets 10, 11, 12, integrally connected to the control carrier 3 by a plurality of control arms 20, the rotational relationship is always produced as a one-to-one ratio between the control carrier 3 and the load shaft 26. The control carrier arms 20 are allowed to rotate freely around the shaft 28, integral to the power shaft 18, by conventional bearing loaded means 80. To allow the angular rotation of the control carrier 3 and the load shaft 26 to vary in speed, brake pad means 55 or speed control means (not shown) integrally attached to the casing 45 is perpendicularly exerted toward the control carrier 3; thereby allowing the rotational motion of the power shaft 18 to surpass the angular rotation of the control carrier 3 (which is equal to the rotation of the load shaft 26) at a proportionate rate relative to the perpendicular force exerted to the control carrier 3 by the brake pad means 55 or speed control (not shown).

In order to permit a more efficient meshing between the angled pairs of planets 10, 11, 12, equal beveled teeth 83 are provided thereto. Moreover, efficiency in the progressive speed reduction of the above-mentioned gears of the first 5 planetary set is provided, for example, by implementation thereto of a 9×-tooth planet meshing with a 10×-tooth planet for the pairs of planets 10, 11, 12 of the first planetary set 5 at contact points 73; thereby providing a cumulative reduction ratio of 100 to 81. Accordingly, syncronization of the rotational parameters between the load gear 22 and control carrier 3, represented herein by the control arms 20 are derived, for example, by the previously illustrated arrangement; i.e., the rotational ratio between the control sun 14 and driven sun 16 of the first planetary set 5 is 81 to 100. Similarly, in the secondary planetary set 8, the rotational ratio between the driving carrier 75 and the ring gear 38 is 81 to 100, as well; thereby, providing a full synchronization between the load gear 22 and the control carrier 3 from zero to full drive, said load gear 22 and said control carrier 3 having equal rotational speed at all times.

Figure 4:
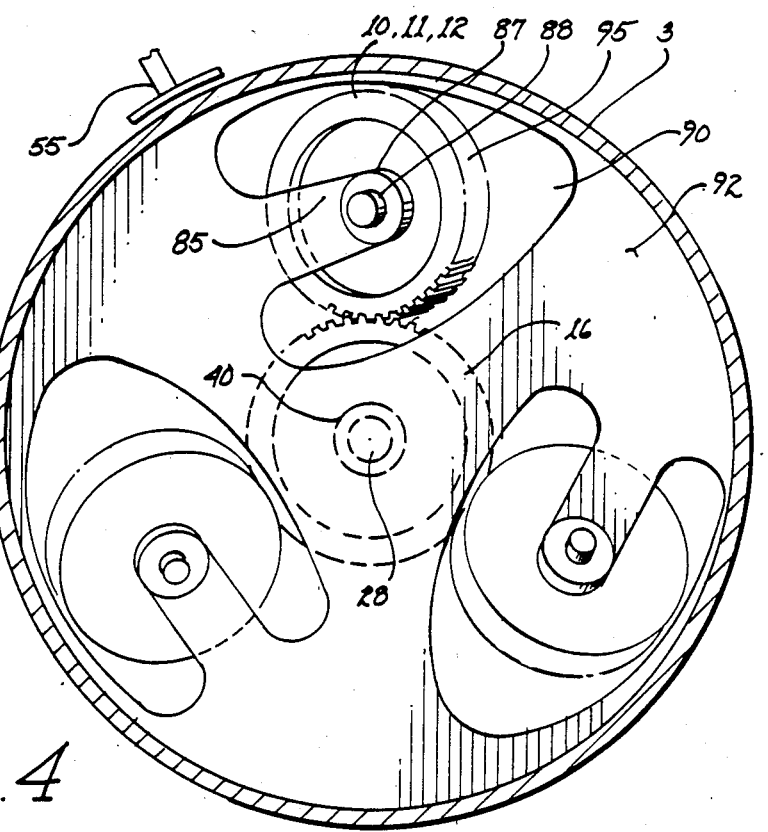
FIG. 4 is a cross-sectional view of the first planetary set, the control carrier wheel and the associated braking control device taken in the direction of arrows 4—4 shown in FIG. 3 illustrating how the control carrier surrounds the first planetary set and communicates with the braking control device.

As shown in FIG. 4, the control carrier 3 can alternatively be provided with an externally protruding flange 85 adaptable for guiding the internally meshing pairs of planets 10, 11, 12. The flange 85 has a preferable end 87 communicating with a conventional gear bearing means 88 to permit the planets 10, 11, 12 to be operably attached thereto and rotate therewith. An aperture 90 having a similar plane along a side member 92 of the control carrier 3 is provided to permit the accommodation of the externally protruding end 95 of each of the pairs of planets 10, 11, 12 rotating around the control 14 and driven 16 suns of the first planetary set 5.

While the invention has been particularly shown and described in reference to preferred embodiments thereof, it will be understood by those skilled in the art that changes in form and details may be made without departing from the spirit and scope of the invention.

I claim:

1. A continuously varying mechanical transmission, comprising:

a first set of planetary gear means for operably connecting to a power shaft;

a secondary set of planetary gear means operably connected to said first set of planetary gear means by a bearing shaft for operably attaching to a load shaft; said first set of planetary gear means comprises: (a) a control sun operably coupled to a shaft means for integrally joining with said power shaft; (b) a driven sun operably coupled to a shaft means for operably joining with said power shaft, said driven sun is located proximate to said control sun, said driven sun and said control sun are equal in size; (c) a plurality of first planet gears suitable for rotating around said control and driven suns, said first planet gears are of equal sizes and are angularly skewed; and (d) a control carrier means for operably joining to said plurality of first planet gears and at least one brake means exerting towards said control carrier of said first set of planetary gears to permit continuous varying proportion in angular rotation between said power shaft and said load shaft.

2. The continuously varying mechanical transmission as in claim 1 wherein said secondary set of planetary gear means comprises:

a. a load gear operably coupled to a interconnecting shaft member means for integrally joining with said load shaft;

b. a plurality of second planetary gears suitable for rotating around said load gear;

c. a ring gear operably interconnected around said plurality of planetary gears; and d. a driving carrier operably connected to each of said planetary gears.

3. The continuously varying mechanical transmission as in claim 2 wherein said plurality of first planet gears are paired with each other, each pair of first planet gears are angled to permit operable meshing with each other.

4. The continuously varying mechanical transmission as in claim 3 wherein said control carrier is a cylindrical casing having therein a plurality of carrier arms, each carrier arm is operably joined to each said pair of said planet gears.

5. The continuously varying mechanical transmission as in claim 4 wherein said control carrier is a cylindrical casing having a plurality of apertures to permit an externally extending portion of said angled planet gears to freely operate therethrough, each aperture has an extending flange thereover integrally originating from a side of said cylindrical casing to permit a planet gear to be operably connected thereto.

6. The continuously varying mechanical transmission as in claim 5 wherein each of said first planet gears has a plurality of bevel gears integrally abutting a contacting side of each of said planet gears which is suitable for meshing.

7. The continuously varying mechanical transmission as in claim 6 wherein said power shaft which is integrally joined to a shaft means to permit passing through said control sun and wherein, said control carrier and said driven sun are operably coupled thereto to said load shaft.

8. The continuously varying mechanical transmission as in claim 7 wherein said driven sun is operably connected to said ring gear of said secondary set of planetary gear means by a bearing shaft means.

9. The continuously varying mechanical transmission as in claim 8 wherein said driving carrier of said secondary set of planetary gear means has a plurality of driving carrier arms, each driving carrier arm is operably joined to each of said planetary gear rotating around said load gear.

10. The continuously varying mechanical transmission as in claim 9 further comprising a brake pad means integrally attached to a casing of said transmission for operably impinging upon said control carrier to permit variable reduction in rotation of said control carrier relative to rotation of said power shaft.

11. A continuously varying mechanical transmission housed within a casing having protruding therefrom on opposite ends a power shaft and a load shaft, comprising:
   a. a first set of planetary gears having a control sun integrally joined to said power shaft; a driven sun operably coupled proximately in parallel to said control sun; a plurality of paired angularly meshing planet gears; and a control carrier means for operably joining to said plurality of planet gears, said control sun and driven sun having equivalent radii, said planet gears having equal radii, said driven sun and said control sun operably joined in parallel by an interconnecting shaft member; and
   b. a secondary set of planetary gears having a load gear operably coupled to said load shaft being operably joined to said first set of planetary gears by a bearing shaft, a plurality of planetary gears altogether joined by a driving carrier having a plurality of carrier arms; and a ring gear operably interconnected around said plurality of planetary gears and at least one brake means exerting towards said control carrier of said first set of planetary gears to permit continuous varying proportion in angular rotation between said power shaft and said load shaft.

12. The continuously varying mechanical transmission as in claim 11 wherein said control carrier is a cylindrical casing having therein a plurality of carrier arms, each carrier arm is operably joined to each said pair of said planet gears.

13. The continuously varying mechanical transmission as in claim 11 wherein said control carrier is a cylindrical casing having a plurality of apertures to permit an externally extending portion of said angled planet gears to freely operate therethrough, each aperture has an extending flange thereover integrally originating from a side of said cylindrical casing to permit a planet gear to be operably connected thereto.

14. The continuously varying mechanical transmission as in claim 12 wherein each of said planet gears has a plurality of bevel gears integrally abutting a connecting side of each of said first planet gears which is suitable for meshing.

15. The continuously varying mechanical transmission as in claim 14 wherein said power shaft is integrally joined to a shaft means to permit passing through said control sun and wherein, said control carrier and said driven sun are operably coupled thereto to said load shaft.

16. The continuously varying mechanical transmission as in claim 15 further comprising a brake pad means integrally attached to a casing of said transmission for operably impinging upon said control carrier to permit reduction in rotation of said control carrier and rotation of said load gear.

17. A method for continuously varying a control carrier rotational operation equal to a load gear in a mechanical transmission, comprising the steps of:
   rotationally operating a power shaft operably interconnected to a driving carrier of a secondary set of planetary gears;
   rotating a plurality of planetary gears of said secondary set of planetary gears around said load gear mounted thereto to a load shaft;
   rotating each planetary gear around each driving carrier arm which is attached thereto by a bearing means, said step of rotating each planetary gear around each driving carrier arm is in the same direction relative to said step of rotating said plurality of planetary gears of said secondary set;
   rotating a ring gear in said secondary set of planetary gears having internal teeth communicating thereto with said plurality of planetary gears;
   operably communicating reaction of said ring gear to a driven sun of a first set of planetary gears operably joined thereto by a bearing shaft;
   rotating a plurality of pairs of planets in said first set of planetary gears angularly meshed with each other;
   rotating a plurality of control arms thereabout said power shaft;
   rotating a control carrier in said first set of planetary gears and thereafter, exerting at least one brake pad toward said control carrier of said first set of planetary gears to permit continuous varying proportion in angular rotation between said power shaft and said load shaft.

* * * * *